United States Patent Office
3,314,954
Patented Apr. 18, 1967

3,314,954
1-(DILOWERALKYLAMINO)-3-(AMINOLOWER-
ALKYL)-3-PHENYLOXINDOLES
Robert F. Meyer, Ann Arbor, Mich., assignor to Parke,
Davis & Company, Detroit, Mich., a corporation of
Michigan
No Drawing. Filed Dec. 9, 1964, Ser. No. 417,210
6 Claims. (Cl. 260—247.2)

The present invention relates to new oxindole compounds and to methods for their production. More particularly, the invention relates to new 1-(di-lower alkyl-amino)-3-(amino-lower alkyl)-3-phenyloxindole compounds, which in their free base form have the formula

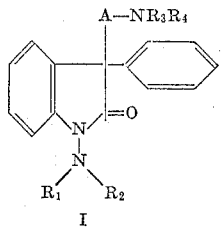

and to pharmaceutically-acceptable acid-addition and quaternary ammonium salts thereof; where each of $R_1$ and $R_2$ is methyl or ethyl; each of $R_3$ and $R_4$ is hydrogen, or lower alkl, or $R_3$ and $R_4$ are combined and together represent oxydiethylene, methylaminodiethylene, or lower alkylene of 4, 5, 6, 7, or 8 carbon atoms, 4 or 5 of which carbon atoms are in annular position with the nitrogen atom to which they are attached; and A represents ethylene, propylene, or trimethylene. When $R_3$ and $R_4$ are combined and represent oxydiethylene, the group —$NR_3R_4$ represents the morpholino radical. When $R_3$ and $R_4$ are combined and represent methylaminodiethylene, the group —$NR_3R_4$ represents the 4-methyl-1-piperazinyl radical. When $R_3$ and $R_4$ are combined and represent lower alkylene, the group —$NR_3R_4$ represents a pyrrolidino, lower alkylpyrrolidino, piperidino, or lower alkylpiperidino radical. Preferred lower alkyl groups for $R_3$ and $R_4$ are methyl and ethyl.

In accordance with the invention, 1-(di-lower alkyl-amino)-3-(amino-lower alkyl)-3-phenyloxindole compounds having the formula

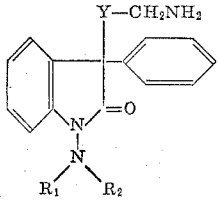

are produced by the catalytic hydrogenation of a nitrile compound having the formula

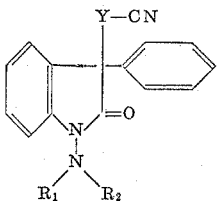

where Y is methylene or ethylene, and $R_1$ and $R_2$ are as defined previously. The hydrogenation is best accomplished by employing gaseous hydrogen at a pressure of 500 to 3000 lbs./in.$^2$ and Raney cobalt in an inert solvent in the presence of an equivalent amount of a tertiary amine. For rapid reaction under these conditions a hydrogen pressure of about 2000 lbs./in.$^2$ is preferred. Other conditions that may also be used to accomplish the hydrogenation include the following: hydrogen at a pressure of about 1–5 atmospheres and a noble metal catalyst, such as platinum, platinum oxide, palladium, or palladium oxide, which may optionally be supported on an inert carrier, such as charcoal; hydrogen at a pressure of about 2000 lbs./in.$^2$ and Raney nickel in the presence of ammonia or a tertiary amine; and hydrogen at a pressure of about 1–10 atmospheres and Raney nickel in the presence of a lower carboxylic anhydride, such as acetic anhydride, followed by hydrolysis of the intermediate alkanoyl derivative. In all cases the hydrogenation reaction is carried out in an inert solvent. Suitable solvents for this purpose are aromatic hydrocarbons, such as benzene, toluene, and xylene; ethers, such as tetrahydrofuran, 1,2-diethoxyethane, and diethylene glycol dimethyl ether; and tertiary amides, such as N,N-dimethylformamide. A preferred solvent is toluene. The temperature and duration of the reaction are not critical and may be varied over a wide range. A temperature range of 50–200° C. may be employed, with a temperature in the range of 75–100° C. being preferred. The reaction is allowed to proceed until the required amount of hydrogen (2 -molecular equivalents) has been taken up. The products of the reaction can be isolated directly as the free base or following conversion to an acid-addition or a quaternary ammonium salt.

The nitrile compound having Formula III used as starting material in the foregoing hydrogenation reaction can be prepared as follows. α-Chlorodiphenylacetyl chloride is reacted with 1,1-dimethylhydrazine or 1,1-diethylhydrazine to obtain a 1-(di-lower alkyl-amino)-3-phenyloxindole. This intermediate product is then reacted with sodium hydride in solution to prepare the sodium salt of the 1-(di-lower alkyl-amino)-3-phenyloxindole, and the sodium salt thus obtained is further reacted, without isolation, with chloroacetonitrile or acrylonitrile to obtain the desired starting material having Formula III.

Also in accordance with the invention, 1-(di-lower alkyl-amino)-3-(amino-lower alkyl)-3-phenyloxindole compounds having the formula

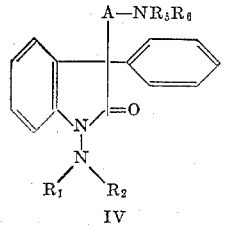

are produced by reacting an alkali metal salt, preferably the sodium salt, of a 1-(di-lower alkyl-amino)-3-phenyl-oxindole compound having the formula

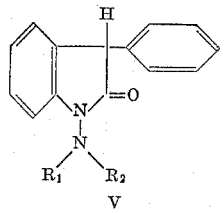

with an aminoalkylhalide compound having the formula

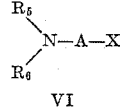

in a non-reactive solvent; where A, $R_1$, and $R_2$ are as defined previously; each of $R_5$ and $R_6$ is lower alkyl, preferably methyl or ethyl; and X is halogen, preferably chlorine or bromine. Suitable non-reactive solvents for the reaction are aromatic hydrocarbons, such as benzene, toluene, or xylene; ethers, such as dioxane, tetrahydrofuran, dibutyl ether, or glycol ethers having no free hydroxyl group; tertiary amides, such as N,N-dimethylformamide; and mixtures of these. Preferred solvents are N,N-dimethylformamide and dioxane. The temperature and duration of the reaction are not critical, and may be varied over a wide range from room temperature for 24 hours to 150° C. for 1–3 hours. Preferred conditions are a temperature of 90–100° C. and a duration of 2–3 hours. Equivalent amounts of the reactants may be used, but it is preferable to employ the aminoalkylhalide compound in slight excess. The alkali metal salt of the 1-(di-lower alkyl-amino)-3-phenyloxindole compound is most conveniently prepared in situ by heating a mixture of the oxindole compound of Formula V and a strong base, such as an alkali metal hydride, preferably sodium hydride, an alkali metal amide, or an alkali metal alkoxide, at about 50° C. for 2–4 hours or until salt formation is complete. If desired, the reaction may be carried out in a single step by heating a mixture of the oxindole compound, the aminoalkylhalide, and the strong base in the chosen solvent until reaction is complete. The products of the reaction are isolated directly as the free base or following conversion to an acid-addition salt or a quaternary ammonium salt.

Further in accordance with the invention, 1-(di-lower alkyl-amino)-3-(amino-lower alkyl)-3-phenyloxindole compounds having Formula I above are produced by reacting a 1-(di-lower alkyl-amino)-3-(haloalkyl)-3-phenyloxiindole compound having the formula

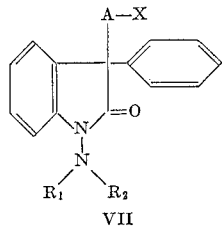

with an amino compound having the formula $R_3R_4NH$

VIII in the presence of a base; where A, X, $R_1$, $R_2$, $R_3$, and $R_4$ are all as defined before. Suitable bases that may be used in the reaction include alkali metal carbonates, alkali metal bicarbonates, alkaline earth metal oxides, alkaline earth metal hydroxides, alkaline earth metal carbonates, and organic tertiary amines of stronger base strength than the amine reactant of Formula VIII. In actual practice, it is most convenient and preferable to employ a large excess of the amine reactant, in which case additional base is not required. In such a case added solvent is also not required, although a wide variety of non-reactive solvents can be used, if desired. These include aliphatic hydrocarbons, such as n-heptane and isooctane; aromatic hydrocarbons, such as benzene and toluene; chlorinated hydrocarbons, such as tetrachloroethylene, chloroform, carbon tetrachloride, ethylene chloride, and chlorobenzene; lower alkanols; ethers, such as isopropyl ether, dioxane, and tetrahydrofuran; N,N-dimethylformamide; and dimethylsulfoxide. The temperature and duration of the reaction are not critical and may be varied over a wide range from room temperature for 8–12 hours at 200° C. for 10–30 minutes. In most cases, the reaction is most conveniently carried out at the reflux temperature of the reaction mixture. Where a low-boiling amine reactant is employed, the reaction is best carried out in a sealed pressure vessel at a temperature of about 90–100° C. Equivalent amounts of reactants may be used; for optimum results, however, at least a two-fold molar excess of the amine reactant is employed. The products of the reaction are isolated directly as free bases or following conversion to an acid-addition salt or a quaternary ammonium salt.

The 1-(di-lower alkyl-amino)-3-(haloalkyl)-3-phenyloxindole compounds having Formula VII used as starting materials in the foregoing procedure are prepared by reacting an alkali metal salt of a 1-(di-lower alkyl-amino)-3-phenyloxindole compound having Formula V above with a lower alkylene halide having the formula

X—A—X

IX where A and X are as defined previously.

The compounds of the invention can exist in the free base form having Formula I, in the form of an acid-addition salt, or in the form of a quaternary ammonium salt. Pharmaceutically-acceptable acid-addition salts are formed with a variety of inorganic and organic acids, such as hydrochloric, hydrobromic, hydriodic, sulfuric, nitric, phosphoric, acetic, propionic, benzoic, oxalic, citric, maleic, tartaric, succinic, sulfamic, p-toluenesulfonic, benzenesulfonic and related acids. The acid-addition salts can be formed by the reaction of the free base with the selected acid by metathesis, by ion exchange, or by other salt-forming means. The acid-addition salts can be converted to the free bases by reaction with a base such as an alkali metal hydroxide or an alkali metal carbonate. Pharmaceutically-acceptable quaternary ammonium salts are formed with salt-forming agents such as methyl iodide, ethyl chloride, ethyl bromide, ethyl iodide, benzyl chloride, and methyl p-toluenesulfonate. The free bases and salts are generally equivalent for the purposes of the invention except that one or the other may be preferred for particular solubility properties.

The compounds of the invention are useful pharmacological agents. They exhibit analgetic activity, and hence are useful in relieving pain. They are preferably administered orally, although they are also active upon parenteral administration.

The invention is illustrated by the following examples:

*Example 1*

A mixture consisting of 20 g. of 1-(dimethylamino)-2-oxo-3-phenyl-3-indolineacetonitrile, 6 g. of Raney cobalt, 6 ml. of triethylamine, and 100 ml. of toluene is shaken at 80°–90° C. with hydrogen at a pressure of 2000 lbs./in.$^2$ for one hour. After cooling, the mixture is filtered, and the filtrate is evaporated to dryness under reduced pressure. The solid 3-(2-aminoethyl)-1-(dimethylamino)-3-phenyloxindole obtained is crystallized from isopropyl alcohol-ether; M.P. 70–72° C.

The 1-(dimethylamino)-2-oxo-3-phenyl-3-indolineacetonitrile used as starting material in the foregoing procedure is prepared as follows. To a stirred solution of 340 g. of α-chloro-diphenylacetyl chloride in 3 liters of dry ether, cooled to —20° C., is added 300 g. of 1,1-dimethylhydrazine. The resulting suspension is kept at room temperature for 16 hours and then diluted with an equal volume of water. The organic phase is separated, washed with water, dried, and evaporated to dryness under reduced pressure to give 1-(dimethylamino)-3-phenyloxindole, M.P. 90–91° C., after crystallization from cyclohexane. To a solution of 25.2 g. of 1-(dimethylamino)-3-phenyloxindole in 100 ml. of N,N-dimethylformamide is added 5 g. of a 53.8% sodium hydride dispersion in mineral oil. The mixture is heated at 50° C. for 3 hours, cooled, and 8.3 g. of chloroacetonitrile is added with stirring. After standing at room temperature for 16 hours, the mixture is heated at 90–100° C. for 2.5 hours, and most of the solvent is removed by evaporation under reduced pressure at 90–100° C. The residue is dissolved in ether, and the ethereal solution is washed with water, dried, and evaporated to dryness under reduced pressure to give 1-(dimethylamino)-2-oxo-3-phenyl-3-indolineacetonitrile; M.P. 116–118° C., after crystallization from isopropyl alcohol.

Example 2

A mixture consisting of 20 g. of 1-(dimethylamino)-2-oxo-3-phenyl-3-indolinepropionitrile, 6 g. of Raney cobalt, 6 ml. of triethylamine, and 100 ml. of toluene is shaken at 80–90° C. with a hydrogen at a pressure of 2000 lb./in.$^2$ for one hour. After cooling, the mixture is filtered, and the filtrate is evaporated to dryness under reduced pressure. The solid 3-(3-aminopropyl)-1-(dimethylamino)-3-phenylindole obtained is crystallized from diisopropyl ether; M.P. 65–66° C.

The 1-(dimethylamino)-2-oxo-3-phenyl-3-indolinepropionitrile employed as starting material in the foregoing procedure is prepared as follows. To a stirred solution 25.2 g. of 1-(dimethylamino)-3-phenyloxindole in 400 ml. of dry ether at room temperature is added 0.5 g. of sodium methoxide and 10 g. of acrylonitrile. After standing for 16 hours at room temperature, the solution is washed with water, dried, and evaporated to dryness to give 1-(dimethylamino)-2-oxo-3-phenyl - 3 - indolinepropionitrile; M.P. 119–120° C., after crystallization from isopropyl alcohol.

Example 3

A solution of 25.2 g. of 1-(dimethylamino)-3-phenyloxindole in 100 ml. of N,N-dimethylformamide is treated with 5 g. of a 53.8% solution hydride dispersion in mineral oil, and the resulting mixture is heated at 50° C. for 3 hours. The mixture is allowed to cool, 15 g. of β-diethylaminoethyl chloride is added, and the mixture is first kept at room temperature for 16 hours and then heated at 90–100° C. for 2.5 hours. The solvent is evaporated under reduced pressure at 90–100° C., and the residue is dissolved in dilute hydrochloride acid. The acidic solution is washed with ether, made alkaline with aqueous sodium hydroxide, and the alkaline mixture is extracted with ether. The ether extract is washed with water, dried, and evaporated to dryness. The 1-(dimethylamino)-3-[2 - (diethylamino)ethyl]-3-phenyloxindole obtained is purified by distillation; B.P. 160° C./0.3 mm. Hg.

In the foregoing procedure, the same product is obtained when 4.3 g. of sodamide is substituted for the sodium hydride dispersion and 20 g. of β-diethylaminoethyl bromide is substituted for the β-diethylaminoethyl chloride.

The hydrochloride salt of 1-(dimethylamino)-3-[2-(diethylamino)ethyl]-3-phenyloxindole is obtained by dissolving 5 g. of the free base in ether, treating the ethereal solution with a slight excess of dry hydrogen chloride, and isolating the precipitated salt.

The oxalate salt of 1-(dimethylamino)-3-[2-(diethylamino)ethyl]-3-phenyloxindole is obtained by treating a solution of 20 g. of the free base in 50 ml. of ethanol with a solution of 7.6 g. of oxalic acid in 20 ml. of ethanol, concentrating the resulting mixture and isolating the precipitated salt.

The methiodide salt of 1-(dimethylamino)-3-[2-(diethylamino)ethyl]-3-phenyloxindole is obtained by heating under reflux a solution of 20 g. of the free base and 10 g. of methyl iodide in acetonitrile for several hours, evaporating the mixture to dryness under reduced pressure, and crystallizing the solid salt from ethanol-ether.

By utilizing the foregoing procedure, with the substitution of 28.0 g. of 1-(diethylamino)-3-phenyloxindole for the 1-(dimethylamino)-3-phenyloxindole, there is obtained 1 - (diethylamino) - 3 - [2 - diethylamino)ethyl]-3-phenyloxindole.

The 1-(diethylamino)-3-phenyloxindole required as starting material can be prepared in a manner analogous to that described in Example 1 above for the preparation of 1-(dimethylamino)-3-phenyloxindole with the substitution of 350 g. of 1,1-diethylylhydrazine for the 1,1-dimethylhydrazine.

Example 4

A solution of 50.4 g. of 1-(dimethylamino)-3-phenyloxindole in 200 ml. of N,N-dimethylformamide is treated with 10 g. of a 53.8% sodium hydride dispersion in mineral oil, and the resulting mixture is heated at 50° C. for 3 hours. After cooling, 27 g. of 1-dimethylamino-2-chloropropane is added, and the mixture is first kept at room tempreature for 16 hours and then heated at 90–100° C. for 2.5 hours. The solvent is evaporated under reduced pressure at 90–100° C., and the residue is dissolved in dilute hydrochloric acid. The acidic solution is washed with ether, made alkaline with aqueous sodium hydroxide, and the alkaline mixture is extracted with ether. The ether extract is washed with water, dried, and evaporated to dryness. The 1-(dimethylamino)-3-[2-(dimethylamino)-propyl]-3-phenyloxindole obtained is purified by distillation; b.p. 165° C./0.1 mm. Hg.

In the foregoing procedure, the same product is obtained when 8.7 g. of sodamide is substituted for the sodium hydride dispersion and 37 g. of 1-dimethylamino-2-bromopropane is substituted for the 1-dimethylamino-2-chloropropane.

Example 5

Employing the procedure of Example 3 above, from the reaction of 25.2 g. of 1-(dimethylamino)-3-phenyloxindole, 5 g. of a 53.8% sodium hydride dispersion in mineral oil and 13.3 g. of 3-dimethylaminopropyl chloride, there is obtained 1-(dimethylamino)-3-[3-(dimethylamino)propyl]-3-phenyloxindole, isolated as the hydrochloride salt by treating the free base in cyclohexane solution with a slight excess of dry hydrogen chloride; M.P. 206–207° C., following crystallization from isopropyl alcohol.

In the foregoing procedure, the hydrobromide salt of 1 - (dimethylamino) - 3 - [3 - dimethylamino)propyl]-3-phenyloxindole is obtained when the free base in a cooled cyclohexane solution is treated with a slight excess of dry hydrogen bromide.

Example 6

A mixture consisting of 10 g. of 1-(dimethylamino)-3-(2-bromoethyl)-3-phenyloxindole and 20 g. of morpholine is heated under reflux for 4 hours. After cooling, the mixture is filtered to remove morpholine hydrobromide, and the filtrate is evaporated to dryness. The solid 1-(dimethylamino) - 3 - (2 - morpholinoethyl) - 3 - phenyloxindole obtained is crystallized from isopropyl alcohol; m.p. 108–109° C.

By utilizing the foregoing procedure, the following 1-(dimethylamino) - 3 - [2 - (heterocyclic amino) - ethyl]-3-phenyloxindole compounds are obtained from the reaction of 1-(dimethylamino)-3-(2-bromoethyl)-3-phenyloxindole and the specified quantity of heterocyclic amine compound:

(a) From reaction with 10 ml. of 1-methylpiperazine there is obtained 1-(dimethylamino)-3-[2-(4-methyl-1-piperazinyl)ethyl]-3-phenyloxindole, isolated as the dihydrochloride hemihydrate salt by treating the free base in benzene solution with a slight excess of dry hydrogen chloride and isolating the precipitated salt; m.p. 215–220° C., following crystallization from acetone.

(b) From reaction with 18 ml. of pyrrolidine, there is obtained 1 - (dimethylamino) - 3 - (2 - pyrrolidinoethyl)-3-phenyloxindole.

(c) From reaction with 22 ml. of 2,6-dimethylpiperidine, there is obtained 1-(dimethylamino)-3-[2-(2,6-dimethylpiperidino)ethyl]-3-phenyloxindole.

The 1 - (dimethylamino) - 3 - (2 - bromoethyl) - 3-phenyloxindole employed as a starting material in the foregoing procedure is prepared as follows. To a solution of 25.2 g. of 1-(dimethylamino)-3-phenyloxindole in 100 ml. of N,N-dimethylformamide is added 5 g. of a 53.8% sodium hydride dispersion in mineral oil. The mixture is heated at 50° C. for 3 hours, cooled, and 10 g. of ethylene bromide is added with stirring. After standing at room temperature for 16 hours, the mixture is heated at 90–100° C. for 2.5 hours, and most of the solvent is removed by evaporation under reduced pressure at 90–100° C. The residue is dissolved in ether, and the ethereal solution is washed with water, dried, and evaporated to dryness under reduced pressure to give 1-(dimethylamino) - 3 - (2 - bromoethyl) - 3 - phenyloxindole; m.p. 89–90° C., following successive crystallizations from n-hexane and isopropyl alcohol.

*Example 7*

A mixture consisting of 10 g. of 1-(dimethylamino)-3-(2-bromoethyl)-3-phenyloxindole and 40 ml. of ethylamine is heated in a sealed pressure vessel at 90–100° C. for 7 hours. After cooling, the vessel is carefully vented, and the mixture is evaporated to dryness. The residue is dissolved in dilute hydrochloric acid, the acidic solution is filtered, and the filtrate is made alkaline with aqueous sodium hydroxide. The alkaline mixture is extracted with ether, and the ethereal extract is washed with water, dried and evaporated to dryness to give 1-(dimethylamino)-3-[2-(ethylamino)ethyl]-3-phenyloxindole, which is purified by distillation; b.p. 174° C./0.2 mm. Hg.

The acetate salt can be obtained by treating a solution of 10 g. of 1-(dimethylamino)-3-[2-(ethylamino)ethyl]-3-phenyloxindole in anhydrous ether with an ethereal solution containing 2 g. of glacial acetic acid, concentrating the resulting mixture, and isolating the precipitated salt by filtration.

What is claimed is:

1. A member of the class consisting of 1-(di-lower alkyl - amino) - 3 - (amino - lower alkyl) - 3 - phenyloxindole compounds, having the formula

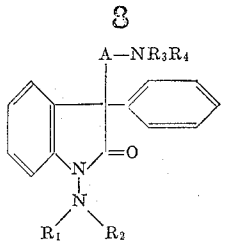

pharmaceutically-acceptable acid-addition salts thereof, and pharmaceutically-acceptable quaternary ammonium salts thereof; where each of $R_1$ and $R_2$ is a member of the class consisting of methyl and ethyl; $R_3$ and $R_4$ are members of the class consisting of hydrogen, lower alkyl, and, together with the nitrogen atom to which they are attached, morpholino, 4-methyl-1-piperazinyl, alkyleneimino, and lower alkyl-alkyleneimino, said alkyleneimino group having more than 3 and fewer than 6 carbon atoms; and A is a member of the class consisting of ethylene, propylene, and trimethylene.

2. 3 - (2 - aminoethyl - 1 - (dimethylamino) - 3 - phenyloxindole.

3. 1 - (dimethylamino) - 3 - [2 - (diethylamino)ethyl]-3-phenyloxindole.

4. 1 - (dimethylamino) - 3 - [3 - (dimethylamino) propyl]-3-phenyloxindole hydrochloride.

5. 1 - (dimethylamino) - 3 - (2 - morpholinoethyl)-3-phenyloxindole.

6. 1 - (dimethylamino) - 3 - [2 - (4 - methyl - 1 - piperazinyl)ethyl] - 3 - phenyloxindole dihydrochloride hemihydrate.

No references cited.

ALEX MAZEL, *Primary Examiner.*
JOSE TOVAR, *Assistant Examiner.*